United States Patent
Sheynblat et al.

(10) Patent No.: US 9,626,238 B2
(45) Date of Patent: Apr. 18, 2017

(54) SENSOR INTERFACE, AND METHODS AND APPARATUS PERTAINING TO SAME

(75) Inventors: Leonid Sheynblat, Hillsborough, CA (US); Bruce Wilson, Palo Alto, CA (US); Abhishek Adappa, San Diego, CA (US); Srinivas Patwari, San Diego, CA (US); Ricky Yuen, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 11/733,130

(22) Filed: Apr. 9, 2007

(65) Prior Publication Data
US 2007/0239399 A1      Oct. 11, 2007

Related U.S. Application Data

(60) Provisional application No. 60/790,252, filed on Apr. 7, 2006.

(51) Int. Cl.
*G06F 9/54* (2006.01)

(52) U.S. Cl.
CPC .............. *G06F 9/547* (2013.01); *G06F 9/542* (2013.01); *G06F 9/545* (2013.01)

(58) Field of Classification Search
CPC .......... G06F 9/542; G06F 9/545; G06F 9/547; G06F 1/1632; G06F 9/4415; H04M 1/72527; H04M 1/7253; H04M 2250/12–2250/14
USPC .............. 702/33–36, 81, 104, 113, 116, 127, 702/187–189
See application file for complete search history.

(56) References Cited

U.S. PATENT DOCUMENTS

| | | | |
|---|---|---|---|
| 6,182,010 B1 * | 1/2001 | Berstis ..................... | 701/211 |
| 6,389,491 B1 | 5/2002 | Jacobson et al. | |
| 7,248,964 B2 * | 7/2007 | Bye .......................... | 701/200 |
| 7,429,936 B2 * | 9/2008 | Paradiso et al. ......... | 340/988 |
| 2002/0017908 A1 * | 2/2002 | Macke et al. ............ | 324/555 |
| 2002/0173295 A1 * | 11/2002 | Nykanen et al. ......... | 455/414 |
| 2002/0188522 A1 * | 12/2002 | McCall et al. ........... | 705/26 |

(Continued)

FOREIGN PATENT DOCUMENTS

JP          2005260914 A          9/2005

OTHER PUBLICATIONS

Honeywell, "Compass Heading Using Magnetometers", Jul. 95, rev. A, AN-203, pp. 1-2.*

(Continued)

*Primary Examiner* — Mischita Henson
(74) *Attorney, Agent, or Firm* — Brian Momeyer

(57) ABSTRACT

A sensor interface is provided with a number of sensor inputs and a number of client inputs. The client inputs are configured to receive a number of data requests from a number of clients. The number of data requests include at least one data request that specifies a particular type of data to be returned, without identifying a particular physical sensor to be used in acquiring the particular type of data. A processor is configured to i) determine what sensor data can be used to satisfy the number of data requests, ii) configure ones of the sensor inputs to receive sensor data from a number of physical sensors, and iii) if possible, satisfy the number of data requests using the received sensor data. Methods and apparatus pertaining to such a sensor interface are also disclosed.

47 Claims, 3 Drawing Sheets

(56) References Cited

U.S. PATENT DOCUMENTS

| | | | |
|---|---|---|---|
| 2003/0061403 A1* | 3/2003 | Miyata et al. | 709/328 |
| 2004/0266480 A1* | 12/2004 | Hjelt et al. | 455/558 |
| 2005/0086264 A1* | 4/2005 | Masuda | 707/104.1 |
| 2005/0144343 A1 | 6/2005 | Hamdan | |
| 2005/0216106 A1* | 9/2005 | Maenner | 700/79 |

OTHER PUBLICATIONS

Kleinitz, Axel, "Dynamic Temperatue Compensation for Pressure Sensors", Apr. 26, 2005, Intersil, AN168.0, pp. 1-3.*
Berberan-Santos, M. et al., "On the barometric formula", May 1997, Am. J. Phys., vol. 65, No. 5, pp. 404-412.*
Brüel & Kjær, "Measuring Vibration", Sep. 1982, Bruel & Kjaer, pp. 1-41.*
Krco et al. "P2P Mobile Sensor Networks", Proceedings of the 38th Hawaii International Conference on System Sciences, Jan. 3, 2005, (9 pages).
Hwang et al. "MASTAQ: A Middleware Architecture for Sensor Applications with Statistical Quality Restraints", Pervasive Computing and Communications Workshops, 2005, (6 pages).
International Search Report, PCT/US2007/066268—Nov. 2, 2007, International Search Authority/EPO (3 pages).
European Search Report—EP12180046—Search Authority—The Munich—Sep. 11, 2012.

* cited by examiner

SENSOR INTERFACE, AND METHODS AND APPARATUS PERTAINING TO SAME

CLAIM OF PRIORITY UNDER 35 U.S.C. §119

The present Application for Patent claims priority to Provisional Application No. 60/790,252 entitled "Sensor API: System Requirements Specification AMSS/DMSS/BREW" filed Apr. 7, 2006, and assigned to the assignee hereof and hereby expressly incorporated by reference herein.

BACKGROUND

Field

The present invention relates generally to sensor interfaces, and more specifically to an extensible sensor interface that is capable of handling partially or fully sensor-independent data requests.

Background

It is becoming common for handheld mobile devices (hereafter, "mobile devices") to incorporate one or more physical sensors. By way of example, the types of mobile devices that may incorporate a number of physical sensors include: telephones, smart phones, personal digital assistants (PDAs), game and other equipment controllers, watches, and bio-feedback devices. The types of physical sensors that these devices may incorporate include, but are not limited to: barometric pressure sensors, accelerometers, magnetic field sensors (e.g., compasses), gyroscopes, and biometric sensors. As defined herein, a "physical sensor" is any sensor that is capable of measuring a physical phenomena and providing an output signal (typically, a digital electrical signal) that quantifies the physical phenomena. The physical phenomena may be, for example, a temperature, pressure, direction, brightness or heart rate.

As the desire to provide mobile devices with applications that require data from more and varied physical sensors increases, and as the types, models and configurations of physical sensors increase, it is becoming more difficult for application developers to develop applications that can be ported to mobile devices having different hardware platforms (e.g., platforms that incorporate different sets of sensors). On the flip side, it is also becoming more difficult for systems engineers to provide a hardware platform that is capable of supporting a wide variety of applications. As a result, it is common for systems engineers and application developers to work in concert to define a unique set of sensing capabilities and applications for a particular mobile device. Once developed, the unique set of capabilities and applications may be of little use in developing a modified or next-generation device; and the device for which the set of capabilities and applications was developed may not be upgradeable to incorporate new sensing capabilities or applications. A need therefore exists for a more flexible and extensible sensor interface.

SUMMARY

Embodiments disclosed herein address the above stated need by providing a sensor interface with a number of sensor inputs and a number of client inputs, wherein the number of client inputs are configured to receive a number of data requests from a number of clients, and wherein the number of data requests include at least one data request that specifies a particular type of data to be returned, without identifying a particular physical sensor to be used in acquiring the particular type of data. The sensor interface is also provided with a processor configured to i) determine what sensor data can be used to satisfy the number of data requests, ii) configure ones of the sensor inputs to receive sensor data from a number of physical sensors, and/or iii) if possible, satisfy the number of data requests using the received sensor data.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
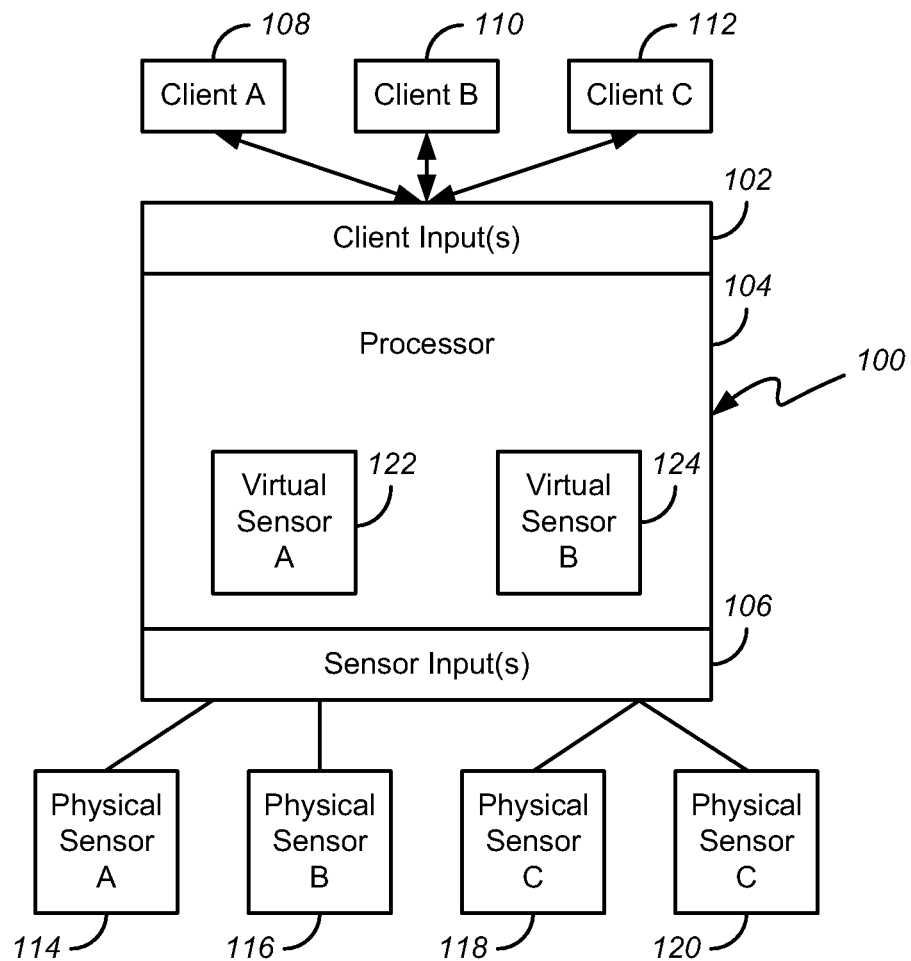
FIG. 1 illustrates a first exemplary sensor interface.

In the context set forth in the Background of this description, FIG. 1 illustrates a sensor interface 100 comprising a number of sensor inputs 106, a number of client inputs 102, and a processor 104. The client inputs 102 are configured to receive a number of data requests from a number of clients 108, 110, 112, and the processor 104 is configured to 1) determine what sensor data can be used to satisfy the number of data requests, 2) configure ones of the sensor inputs 106 to receive sensor data from a number of physical sensors 114, 116, 118, 120, and 3) if possible, satisfy the number of data requests using the received sensor data.

As defined herein, "a number of" means "one or more", and "a plurality of" means "two or more". Each of the numbers of sensor inputs 106, client inputs 102, clients 108, 110, 112, data requests and physical sensors 114, 116, 118, 120 recited in the above paragraph may variously include a plurality of these elements.

The "clients" 108, 110, 112 that request data from the sensor interface 100 may take various forms, and may include, but are not limited to, a number of software or firmware-based applications, a number of user or system applications, or a device operating system. Of note, the clients 108, 110, 112 are sometimes referred to herein as "applications" (of which there can be various kinds, as described above). Some or all of the data requests that are generated by the clients 108, 110, 112 may specify a particular type of data to be returned by the sensor interface 100, without identifying a particular physical sensor 114, 116, 118, 120 that is to be used in acquiring the particular type of data. Thus, for example, a client 108 might request linear motion data for a mobile device, without specifying the type or model of sensor that is to be used in acquiring the linear motion data. Or, a client 110 might request orientation data for a mobile device, without specifying the type or model of sensor that is to be used in acquiring the orientation data. These sorts of sensor-independent requests (or at least partially sensor-independent requests) enable the sensor interface 100 to be used more efficiently, because they place the processor 104 under fewer constraints as it determines what sensor data can be used to satisfy what data requests. Below are some examples that better illustrate this point.

First, consider a device having a particular set of sensor types and models, in which the sensors are capable of providing a particular set of sensor data. In the past, an application would not have been able to obtain or use the device's sensor data unless the application had been developed to support one or more of the device's particular sensors. This meant that, even though a device might have been able to acquire a particular "type of data" needed by an application, an application would not have been able to use the data unless the data was provided by a particular "type and model of sensor" for which the application had been developed. It also meant that, if an application developer wanted an application to be compatible with a variety of devices, the application developer had to provide the application with support for a plethora of different sensor types and models. However, when an application is developed to work with the sensor interface 100, the application may simply request a particular type of data and allow the sensor interface to 1) determine what sensor data can be used to satisfy the request, 2) receive the sensor data, and 3) satisfy the request.

Second, consider a device that is initially designed with a first set of sensors, but due to a design change is reconfigured to incorporate a second set of sensors. Or, consider a device with an upgradeable sensor set. In the past, a change in the device's sensor set might have necessitated one or more patches to the device's applications. However, when an application merely requests a particular type of data, firmware or software upgrades can likely be isolated to the sensor interface 100 (if an upgrade is needed at all).

Third, consider a device with a wireless communication interface. By providing the device with the sensor interface 100, and by configuring the processor 104 to dynamically discover physical sensors that reside outside of a device in which the sensor interface 100 is installed (e.g., via a wireless interface), the device may be provided access to 1) sensors that were never contemplated by the makers of the device, 2) sensors that are too large or expensive to be incorporated into the device, or 3) sensors that are only useful to smaller subsets of a device's users.

Figure 2:
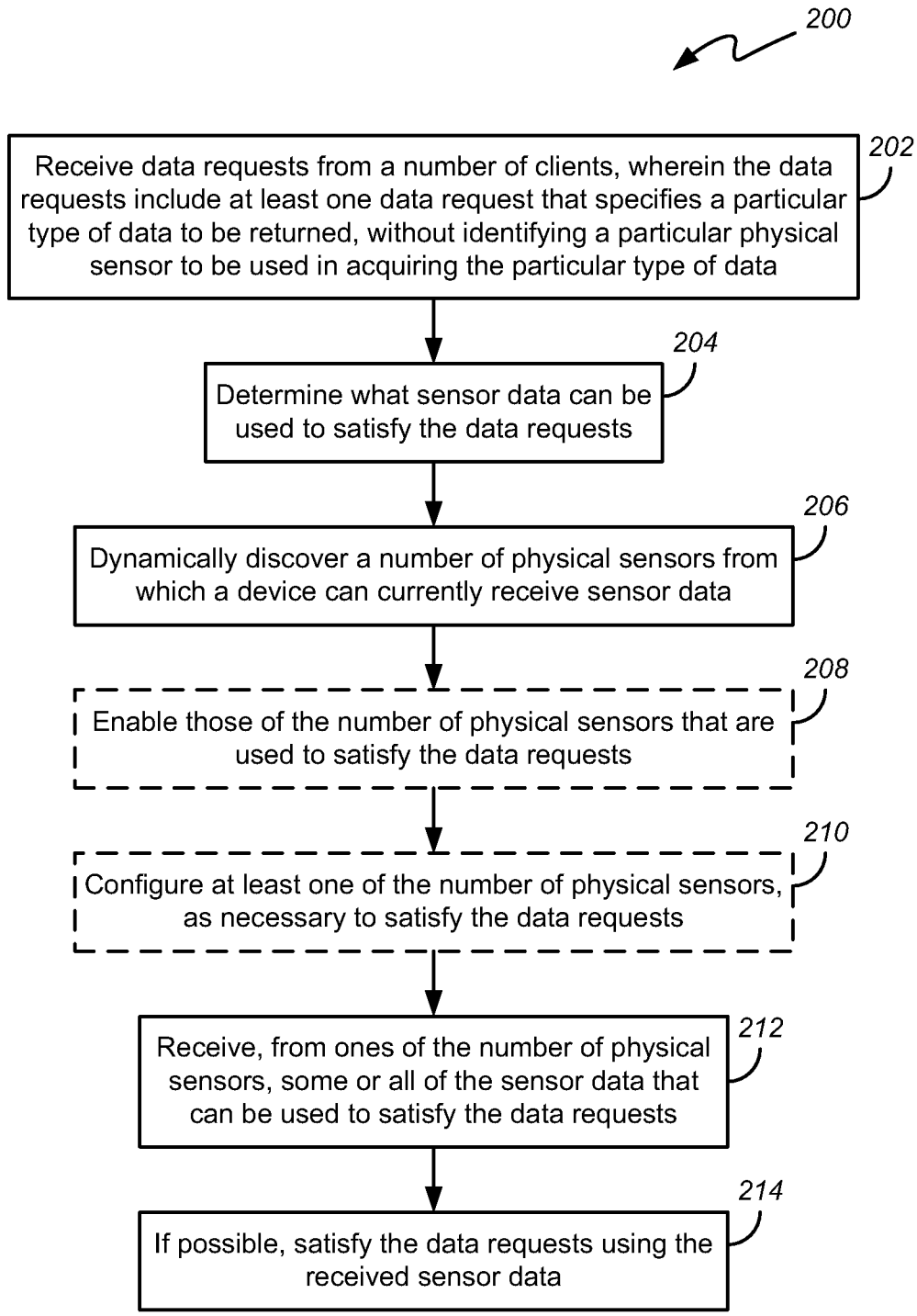
FIG. 2 illustrates a method for using a sensor interface such as the sensor interface shown in FIG. 1 or the sensor interface shown in FIG. 3.

The sensor interface 100 may be used in various ways, but one exemplary way is shown in FIG. 2. In accord with the method 200 (FIG. 2), the client inputs 102 of the sensor interface 100 may receive data requests from a number of clients 108, 110, 112 (block 202). As discussed previously, the data requests may include at least one data request that specifies a particular type of data to be returned, without identifying a particular physical sensor 114, 116, 118, 120 that is to be used in acquiring the particular type of data. The sensor interface 100 then determines what sensor data can be used to satisfy the data requests, and dynamically discovers a number of physical sensors 114, 116, 118, 120 from which apparatus (e.g., a device) in which the sensor interface 100 is incorporated can currently receive sensor data (blocks 204, 206). Optionally, some or all of the physical sensors 114, 116, 118, 120 may be enabled or configured (blocks 208, 210). In one embodiment, only those physical sensors that are determined to be necessary to satisfy a current set of data requests are enabled and configured.

After determining what sensor data is needed to satisfy the data requests, and after discovering what sensors 108, 110, 112 are available, the method 200 receives sensor data from some or all of the available sensors 114, 116, 118, 120 and, if possible, satisfies the data requests using the received sensor data.

Of note, the steps of the method 200 shown in FIG. 2 may be performed in different orders, and some steps may be performed simultaneously or repetitively.

In some cases, the method 200 may determine that the raw sensor data received from one or more physical sensors 114, 116, 118, 120 is not capable of satisfying a data request, but that the raw sensor data received from one or more physical sensors may be converted or combined to satisfy the data request. In this regard, the sensor interface 100 may be programmed to provide one or more "virtual sensors" 122, 124. As defined herein, a "virtual sensor" is a sensor that receives sensor data obtained by one or more physical sensors 114, 116, 118, 120, converts or combines the sensor data, and provides an output. By way of example, the output may 1) quantify a physical phenomena, 2) provide a judgment or rating of a physical phenomena (e.g., is it sunny or dark), or 3) signify the occurrence of an event. Exemplary "conversions" and "combinations" of sensor data include 1) using a first piece of sensor data to correct a second piece of sensor data (e.g., to improve the accuracy of the second piece of sensor data, in the presence of a condition quantified by the first piece of sensor data), 2) averaging outputs from multiple physical sensors 114, 116, 118, 120, 3) normalizing outputs from one or more physical sensors 114, 116, 118, 120, 4) converting the units of sensor data, or 5) making judgments or ratings based on the outputs of one or more physical sensors 114, 116, 118, 120. Sensor data may also be converted or combined based on data acquired from non-sensor sources. For example, if multiple sensor readings are to be averaged, a current time may be used to discard certain readings from the average. Following are some specific examples that show how sensor data may be converted or combined by means of virtual sensors 122, 124 of the sensor interface 100.

One example of a virtual sensor is a tilt-compensated compass. The virtual compass may receive raw magnetic heading data from a "real" physical compass, as well as tilt data from a three-dimensional (3D) accelerometer. Using currently available mathematical algorithms, the virtual sensor can then use the accelerometer data to compensate for tilt of the physical compass.

Another example of a virtual sensor is a temperature-corrected pressure sensor, wherein the virtual sensor uses a sensed temperature to correct a pressure reading for temperature-dependent characteristics of the physical sensor that obtained the pressure reading.

Another example of a virtual sensor is an altitude sensor. For example, a virtual altitude sensor might receive a barometric pressure reading and use a look-up table or mathematical algorithm to estimate a corresponding altitude.

Still another example of a virtual sensor is a linear motion and orientation sensor. Exemplary linear motion and orientation sensors are described in U.S. patent application Ser. No. 11/686,945, entitled "Sensor-Based Orientation System", which is incorporated by reference herein in its entirety.

Yet another example of a virtual sensor is a vibration sensor which receives accelerometer data and uses the accelerometer data to quantify the vibration experienced by a device.

A subset of virtual sensors is "event sensors". One example of a virtual event sensor is a "zero G" or drop detection sensor. Such a sensor might receive sensor data from an accelerometer, monitor the sensor data to determine if it exceeds a drop detection threshold, and provide an output indicative of whether a device has been dropped. Other virtual "event sensors" may monitor various types of sensor data to determine, for example: whether a device is being moved; a temperature change; an altitude or pressure change; a velocity change; or whether a device has traveled a predetermined distance.

Some virtual event sensors may be used to navigate between elements of a graphical user interface (GUI). For example, a virtual event sensor may correlate a user's tilt or orientation of a device with the user's desire to navigate to a particular element or control of a GUI. At the same time, the virtual event sensor may monitor the accelerometer data for evidence of a "shake" or "double-tap" and interpret same as a user's desire to select the GUI element or control to which the user has navigated.

Returning to the method 200, there may be times when the physical sensors 114, 116, 118, 120 discovered by the method 200 are not be able to satisfy some or all of the data requests received by the sensor interface 100. That is, there may be times when sensor data is needed but cannot be obtained. In these cases, the method 200 may return alert or error notifications to those clients whose requests cannot be satisfied. Or, the method 200 may simply ignore those requests that it cannot satisfy.

There may also times when the discovered sensors 114, 116, 118, 120 are technically capable of providing the data needed to satisfy a plurality of data requests, but parameters associated with the data requests appear to conflict. For example, consider a first request for accelerometer readings at a rate of one sample per second (1 Hertz), and a second request for accelerometer readings at a rate of one hundred samples per second (100 Hertz). Although these requests conflict, both requests can be satisfied by acquiring accelerometer readings at a rate of 100 Hertz, and then subsampling the readings to fulfill the first request. When data requests conflict, the processor 104 of the sensor interface 100 may determine how one or more physical sensors 114, 116, 118, 120 may be configured to satisfy apparently conflicting requests in parallel. When no available solution exists, the processor 104 may arbitrate the satisfaction of data requests requiring conflicting sensor configurations. In some cases, the arbitration may involve prioritizing which requests are fulfilled first. In other cases, the arbitration may result in the return of alert or error notifications for certain requests.

If some or all of the data requests received by the sensor interface 100 are fully or partially sensor-independent, the sensor interface's processor 104 may be configured to select from between two or more ways to satisfy a particular request. For example, an accelerometer and a wheel speed sensor might provide data that is independently able to indicate direction of movement. Thus, if one sensor is unavailable, a data request may be satisfied using data obtained from the other sensor. Or, if conflicts between two data requests cannot be reconciled, each data request may satisfied using data obtained from a different one of the sensors.

Fully or partially sensor-independent data requests also allow data requests to be satisfied in accord with other criteria. For example, when different sets of sensors can be used to satisfy a set of data requests, the set of sensors used to satisfy the data requests may be chosen to, for example: conserve power; minimize the number of physical sensors used; minimize processor usage (e.g., by minimizing the reliance on virtual sensors when more sophisticated physical sensors are available); minimize noise; increase response time; or satisfy quality of service requests. Processor usage may also be minimized by pushing more work to "smart" sensors. For example, "smart" sensors may be capable of auto-configuring a sensor, reading and responding to QoS requests (explained below), converting or combining data similarly to one or more virtual sensors, or detecting events such as "zero G" events (e.g., as is the case with a zero G accelerometer).

In one embodiment, the sensor interface 100 (FIG. 1) may implement an input, output or bi-directional quality control. For example, on the input side, the processor 104 may be configured to read quality-of-service (QoS) requests associated with one or more of the data requests received by the sensor interface 100. The QoS requests may include, for example: a request to prioritize time per measurement over accuracy of measurement (or vice versa); an indication on how to balance time per measurement and accuracy of measurement; a measurement sampling rate; a measurement duration; a measurement capture trigger; a measurement return trigger (e.g., a threshold that needs to be met before sensor data is processed or a data request is satisfied); a time constant for measurement filtering; a measurement resolution; an indication on how to balance bandwidth (e.g., number of samples or speed of return) and data resolution; or an accelerometer g-range selection.

As defined herein, a QoS request differs from a typical configuration request in that a configuration request is sensor-specific and a QoS request is at least partially sensor-independent. A QoS may therefore be generated by a sensor user or application developer without any knowledge of what sensors are available or how they work. Rather, the sensor user or application developer need only know what kind of data they want and how it can be acquired. In this regard, an application programming interface (API) may be defined for the sensor interface 100, and an application developer may use the API to determine what sorts of data and QoS requests can be processed by the sensor interface 100.

The processor 104 can be further configured to 1) determine what sensor data can be used to satisfy the QoS requests, and 2) if possible, satisfy the one or more data requests in accord with any associated QoS requests. The processor 104 may use QoS requests in various ways. In some cases, the processor 104 may use a QoS request to determine which of two or more sensors should be used to satisfy a data request. For example, if two sensors are capable of fulfilling a data request, but there is a time or power savings associated with one of the sensors, the processor may be configured to normally acquire data from the sensor that saves time or power. However, if a QoS request can only be met by acquiring data from the more costly sensor, the processor may be configured to respond to the QoS request by acquiring data from the more costly sensor. In other cases, it may be possible to "correct" or improve data obtained from one sensor by combining it with data obtained from another sensor. In these cases, a QoS request may cause a processor 104 to correct data that it would ordinarily pass to a client "uncorrected".

In some cases, the processor 104 can be configured to only satisfy data requests when their associated quality of service requests can be met. In other cases, the processor 104 can be configured to satisfy data requests whenever possible, and make a "best effort" to satisfy their associated QoS requests.

On the output side, the processor 104 may be configured to return both data, and one or more indicators of data quality. The indicators of data quality may include, for example: an indication of data accuracy; a data resolution; an indication that a data skewing event occurred (e.g., a device shock); an indication that a sensor limit was saturated (e.g., acceleration magnitude above 1000 g was detected); an indication that data samples were lost; or an indication of whether data is believed to be valid. Data may also be returned with a timestamp.

In addition to being configured to read and respond to QoS requests, the processor 104 may be configured to read and respond to configuration requests directed to particular sensors 114, 116, 118, 120.

The processor 104 may be further configured to initiate a broadcast of, or "advertise", 1) the existence of the sensor interface 100, or 2) the existence of at least one of the physical sensors 114, 116, 118, 120 that are discovered by the sensor interface 100. In one embodiment, the broadcast is initiated via a wireless interface of the sensor interface 100. In this manner, clients installed on devices other than a "Device A" in which the sensor interface 100 is installed may use the sensor interface 100 to access the physical sensors that are available to the "Device A". For example, if some or all of a plurality of mobile phones or PDAs are provided with sensor interfaces such as the interface 100, some devices may become clients of other devices, and thereby access the physical or even virtual sensors that are available via the sensor interface(s) of the other device(s).

The client inputs of the sensor interface 100 may comprise both wired and wireless inputs. In one embodiment, at least one client input (e.g., a wired client input) may be dedicated for receiving data requests from clients installed on a mobile device in which the sensor interface 100 is physically installed, and at least one other client input (e.g., a wireless client input) may be configured to receive data requests from clients that are external to the mobile device in which the sensor interface 100 is physically installed.

Figure 3:
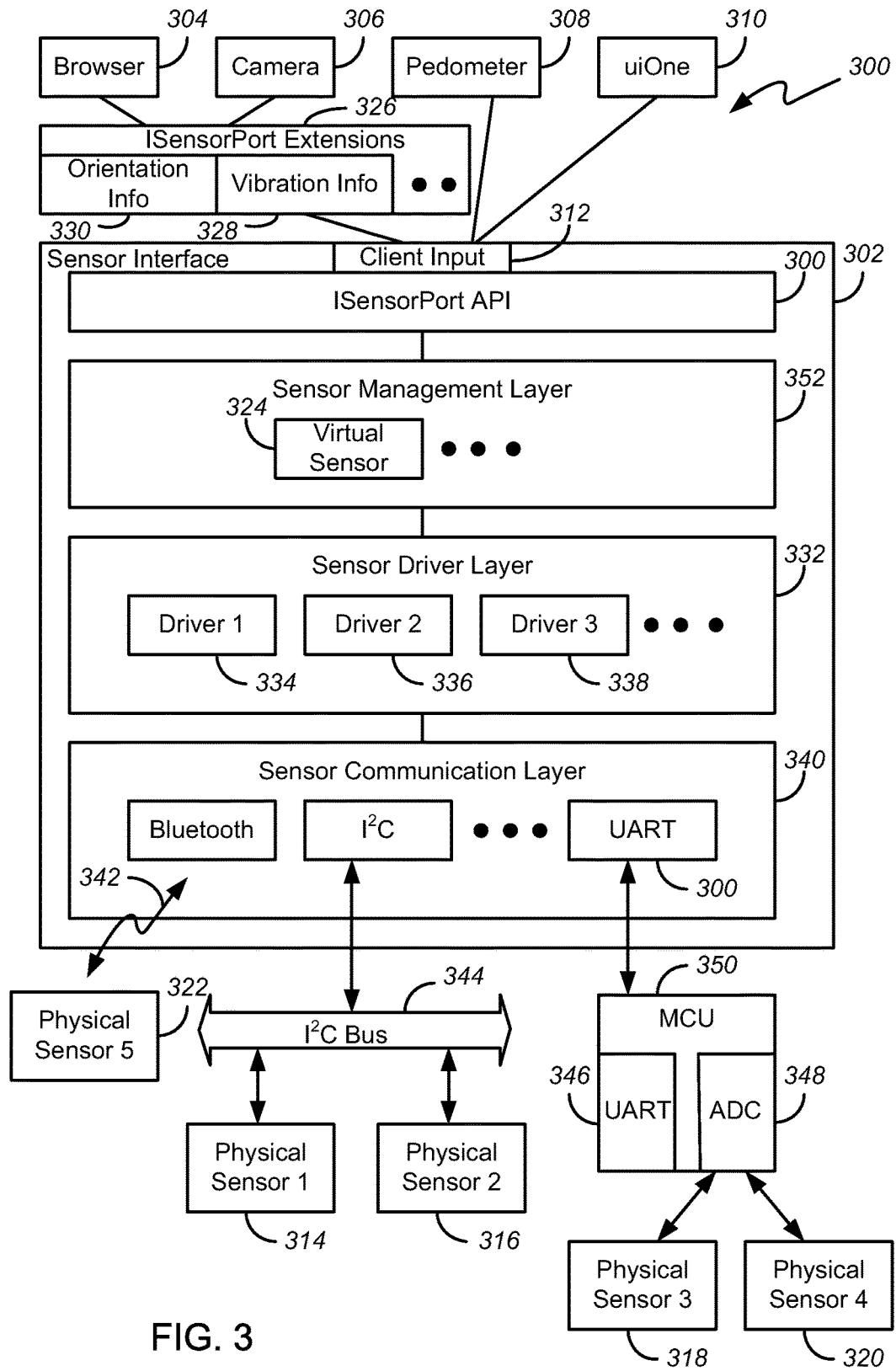
FIG. 3 illustrates a device incorporating a second exemplary sensor interface.

FIG. 3 illustrates one exemplary implementation 302 of the sensor interface 100. By way of example, the sensor interface 302 is implemented in a device 300 having a number of installed applications 304, 306, 308, 310. The device 300 may take various forms, such as those of a handheld mobile device, a computer, or a transportation vehicle. The installed applications may also take various forms, and may comprise, for example, a web browser 304, camera 306, pedometer 308, global positioning system, Qualcomm uiOne user interface 310, or device operating system. The sensor interface 302 may comprise a number of client inputs 312 that, in one embodiment, take the form of a single COM port. Access to an ISensorPort API may be provided via the COM port.

The ISensorPort API may provide a bi-directional connection to a number of physical and/or virtual sensors 314, 316, 318, 320, 322, 324, and may support I/O functions such as open/read/write/close/ioctl. The ISensorPort API is configured to receive data requests from a number of installed applications 304, 306, 308, 310, and return responses in the form of raw or abstracted sensor data. The installed applications 304, 306, 308, 310 may access the abstracted sensor data via a number of ISensorPort extensions 326, which in turn provide access to a number of virtual sensors 324. By way of example, the ISensorPort extensions 326 could comprise extensions 328, 330 for accessing vibration information (e.g., for an image stabilization application) or orientation information.

Preferably, sensor interface clients 304, 306, 308, 310 are not allowed to communicate with specific known sensors (e.g., specific types and models of sensors) via the ISensorPort API. Rather, clients 304, 306, 308, 310 are only allowed to request a particular type of raw or abstracted sensor data. In this manner, and as previously described, the sensor interface 302 is provided more flexibility in determining how data requests are satisfied. However, in one embodiment, applications are allowed to communicate with specific sensors.

In one embodiment, the ISensorPort API may inherit and implement the Qualcomm BREW 4.0 Component Services' IPORT1 interface, which provides a directly remotable read/write port.

The sensor interface 100 further comprises a sensor driver layer 332. The sensor driver layer 332 comprises a number of sensor drivers 334, 336, 338 that serve to carry out vendor-specific sensor initialization, calibration, configuration, and read/write operations. The sensor drivers 334, 336, 338 may perform their operations via a sensor communication layer 340 that supports connectivity to one or more sensor communication interfaces 342, 344, 346, such as I2C, UART and Bluetooth interfaces. Preferably, both the sensor driver and sensor communication layers 332, 340 are extensible, meaning that sensor drivers 334, 336, 338 and sensor communication interfaces 342, 344, 346 can be added to these layers.

By way of example, FIG. 3 illustrates a pair of physical sensors 314, 316 that are coupled to the communication layer 340 via an I2C bus 344; another pair of sensors 318, 320 that are coupled to an analog-to-digital converter (ADC) 348 of a microcontroller 350 that is in turn coupled to the communication layer 340 via a UART 346; and a physical sensor 322 that is coupled to the communication layer 340 via a Bluetooth connection 342.

The sensor interface 100 further comprises a sensor management layer 352. The sensor management layer 352 serves to manage multiple client connections and data requests, arbitrate access to physical sensors 314, 316, 318, 320, 322, and provide virtual sensor support. The sensor management layer 352 also determines how data requests are satisfied (e.g., by mapping particular data requests to particular physical or virtual sensors 314, 316, 318, 320, 322, 324). The sensor management layer 352 may also be largely responsible for performing the method 200 shown in FIG. 2.

At times, multiple clients 304, 306, 308, 310 may require simultaneous access to the data generated by one or more physical sensors 314, 316, 318, 320, 322. As a result, data obtained from a physical sensor may need to be buffered, and then copied, so that it may be provided to multiple consumers (e.g., sensor interface clients 304, 306, 308, 310 or virtual sensors 324). In some cases, a physical sensor's data buffer may be sized to hold a single sample. In other cases, a sensor's data buffer may be sized to hold multiple samples. In still other cases, a sensor's data buffer may be sized to hold an array of samples, as might be necessary, for example, to hold x,y,z acceleration values produced by a 3D accelerometer. A buffer may also be sized dynamically, based on such factors as: the number and size of data samples produced by a particular sensor, the rate at which data samples are being acquired, or the number of clients 304, 306, 308, 310 that require access to a sensor's data.

Copies of the data obtained from a physical sensor need not be identical. For example, sensor data may be subsampled to yield data sets having different numbers of samples. Or, a particular copy of a sensor's data may be subjected to low-pass filtering or other pre-processing requirements.

In one embodiment, a client 304 of the sensor interface 302 may send QoS or data requests via ASCII messages. These messages may take the following forms:

```
"set, <datatype1>=<attribute1>:<value1>[,
<datatype2>=<attribute2>:<value2>]..."
"get, <attribute1>[, attribute2>]..."
```

To request acceleration in the x-axis using the above messages, a user might set a desired measurement frequency as follows:

"set, accelx:freq=10"

Then, to initiate data generation, the following message might be sent:

"get, accelx"

The data request may then be satisfied by returning a stream of data including the following messages:

"get, accelx=123, errorno=0"
"get, accelx=234, errorno=0"

The data stream may be terminated with the following message:

"set, accelx:freq=0"

In the above example, the "errorno=0" portions of the returned data stream are indicative of there being no errors in the returned data samples. If a data sample was believed to be erred because, for example, a sensor limit had been saturated (or a device shock might have interfered with a reading), an indication of "errorno=1" or "errorno=2" might be returned with the affected sample or samples. Thus, error codes may be used to simply signify whether or not an error (of any kind) exists, or error codes may be used to specify various different types of errors.

Those of skill will appreciate that the various illustrative logical blocks, modules, and steps described in connection with the embodiments disclosed herein may be implemented via electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and steps described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal such as a handheld mobile device (e.g., a telephone or PDA). In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A sensor interface in a client device, comprising:
   a number of sensor inputs;
   a number of client inputs configured to receive one or more data requests from a number of client applications configured for execution by the client device, wherein the one or more data requests include a data request that specifies a particular type of sensor measurement data to be returned, without identifying a particular physical sensor to be used in acquiring the particular type of sensor measurement data; and
   a processor configured to:
      discover, in response to receiving the one or more data requests, a number of physical sensors that are physically installed in the client device from which the client device can currently receive sensor data that can be used to obtain the particular type of sensor measurement data specified by the data request;
      receive, from at least two different types of physical sensors of the number of physical sensors that are physically installed in the client device, at least two different types of sensor data; and
      attempt to satisfy the data request using the at least two different types of sensor data.

2. The sensor interface of claim 1, wherein the processor is further configured to dynamically discover at least one additional physical sensor that resides outside of the client device in which the sensor interface is installed.

3. The sensor interface of claim 1, wherein the number of sensor inputs is a plurality of sensor inputs.

4. The sensor interface of claim 1, wherein the number of physical sensors is a plurality of physical sensors.

5. The sensor interface of claim 1, wherein the number of client inputs is a plurality of client inputs.

6. The sensor interface of claim 1, wherein the number of client applications is a plurality of client applications.

7. The sensor interface of claim 1, wherein the processor is configured to combine the at least two different types of sensor data in response to determining that at least one of the two different types of sensor data is not capable of satisfying the data request.

8. The sensor interface of claim 1, wherein the processor is configured to convert at least one of the two different types of sensor data in response to determining that the at least one of the two different types of sensor data is not capable of satisfying the data request.

9. The sensor interface of claim 1, wherein the processor is configured to select from between two or more ways to satisfy the data request using the at least two different types of sensor data.

10. The sensor interface of claim 1, wherein the processor is configured to select from between two or more ways to satisfy the data request using the at least two different types of sensor data, and wherein the selection is made to conserve power provided to the number of physical sensors that are physically installed in the client device.

11. The sensor interface of claim 1, wherein the processor is configured to attempt to satisfy the data request by enabling only those of the number of physical sensors that are used to satisfy the data request.

12. The sensor interface of claim 1, wherein the processor is configured to configure at least one of the two different types of physical sensors, as necessary to satisfy the data request.

13. The sensor interface of claim 12, wherein the processor is configured to arbitrate satisfaction of the one or more data requests with conflicting configurations of the at least one of the two different types of physical sensors that the processor is configured to configure.

14. The sensor interface of claim 1, wherein the processor is configured to configure at least one of the two different types of physical sensors, to satisfy multiple competing data requests in parallel.

15. The sensor interface of claim 1, wherein the processor is configured to i) read one or more quality of service requests associated with the data request, ii) determine what sensor data can be used to satisfy the one or more quality of service requests, and iii) attempt to satisfy the data request in accordance with the one or more quality of service requests.

16. The sensor interface of claim 15, wherein the processor is configured to, in response to at least one of the one or more quality of service requests, combine at least some of the determined sensor data to satisfy the data request.

17. The sensor interface of claim 15, wherein the processor is configured to satisfy the data request by returning both data, and an indicator of a quality of the data.

18. The sensor interface of claim 15, wherein the processor is configured to satisfy the data request by returning both data, and an indicator of a validity of the data.

19. The sensor interface of claim 1, wherein the processor is configured to satisfy the data request by returning both data, and an indicator of quality of the data.

20. The sensor interface of claim 1, wherein the processor is configured to satisfy the data request by returning both data, and an indicator of validity of the data.

21. The sensor interface of claim 1, further comprising a wireless interface, wherein the processor is configured to initiate, via the wireless interface, a broadcast of an existence of one or more of the number of physical sensors.

22. The sensor interface of claim 1, further comprising a wireless interface, wherein the processor is configured to initiate, via the wireless interface, a broadcast of an existence of the sensor interface.

23. The sensor interface of claim 1, wherein the number of client inputs include i) at least one wired client input that is configured to receive data requests from client applications installed on the client device in which the sensor interface is physically installed, and ii) at least one wireless client input that is configured to receive data requests from clients external to the client device in which the sensor interface is physically installed.

24. The sensor interface of claim 1, wherein the one or more data requests include a plurality of data requests, with two or more of the plurality of data requests being from different client applications.

25. The sensor interface of claim 1, wherein the at least two different types of physical sensors include at least two different physical sensors selected from the group consisting of: a physical compass, a three-dimensional (3D) accelerometer, a temperature sensor, a pressure sensor, an altitude sensor, a linear motion sensor, and an orientation sensor.

26. The sensor interface of claim 25, wherein the processor is configured to provide a virtual sensor comprising a tilt-compensated compass to satisfy the data request by compensating magnetic heading data received from the physical compass using tilt data received from the accelerometer.

27. The sensor interface of claim 25, wherein the processor is configured to provide a virtual sensor comprising a temperature-corrected pressure sensor to satisfy the data request by correcting a pressure reading received from the pressure sensor using a temperature reading received from the temperature sensor.

28. The sensor interface of claim 25, wherein the processor is configured to provide a virtual sensor comprising an altitude sensor to satisfy the data request by estimating a corresponding altitude based on a barometric pressure reading received from the pressure sensor.

29. The sensor interface of claim 25, wherein the processor is configured to provide a virtual sensor comprising a vibration sensor to satisfy the data request to quantify vibration experiences by the client device using accelerometer data received from the accelerometer.

30. The sensor interface of claim 25, wherein the processor is configured to provide a virtual event sensor to signify an occurrence of an event selected from the group consisting of: drop detection of the client device, whether the client device is being moved, a temperature change of the client device, an altitude change of the client device, a pressure change of the client device, a velocity change of the client device, and whether the client device has traveled a predetermined distance.

31. A method performed by a client device, comprising:
receiving one or more data requests from a number of client applications configured for execution by the client device, wherein the one or more data requests include a data request that specifies a particular type of sensor measurement data to be returned, without identifying a particular physical sensor to be used in acquiring the particular type of sensor measurement data;
discovering, in response to the receiving the one or more data requests, a number of physical sensors that are physically installed in the client device from which the client device can currently receive sensor data that can be used to obtain the particular type of sensor measurement data specified by the data request;
receiving, from at least two different types of physical sensors of the number of physical sensors that are physically installed in the client device, at least two different types of sensor data; and
attempting to satisfy the data request using the at least two different types of sensor data.

32. The method of claim 31, further comprising:
enabling only those of the number of physical sensors that are used to satisfy the data request.

33. The method of claim 31, further comprising:
configuring at least one of the two different types of physical sensors of the number of physical sensors, as necessary to satisfy the data request.

34. The method of claim 31, further comprising:
combining the at least two different types of sensor data in response to determining that at least one of the two different types of sensor data is not capable of satisfying the data request.

35. The method of claim 31, further comprising:
converting at least one of the two different types of sensor data in response to determining that the at least one of the two different types of sensor data is not capable of satisfying the data request.

36. The method of claim 31, further comprising:
broadcasting an existence of one or more of the number of physical sensors.

37. A client device, comprising:
a number of installed client applications configured for execution by the client device;
a number of sensor communication interfaces; and
a sensor interface configured to:
provide an application programming interface (API), wherein the API is configured to receive one or more data requests from the number of installed client applications, and the one or more data requests includes a data request that specifies a particular type of sensor measurement data to be returned, without identifying a particular physical sensor to be used in acquiring the particular type of sensor measurement data;
discover, in response to receiving the one or more data requests, a number of physical sensors that are physically installed in the client device from which the client device can currently receive sensor data that can be used to obtain the particular type of sensor measurement data specified by the data request;
host a number of sensor drivers configured to communicate with the number of physical sensors via the number of sensor communication interfaces to receive, from at least two different types of physical sensors of the number of physical sensors that are physically installed in the client device, at least two different types of sensor data; and
attempt to satisfy the data request using the at least two different types of sensor data.

38. The client device of claim 37, wherein the number of installed client applications include at least one of: a web browser, a camera, a pedometer, and a global positioning system.

39. The client device of claim 37, wherein the sensor interface i) is configured to provide a virtual sensor that combines the at least two different types of sensor data in response to determining that at least one of the two different types of sensor data is not capable of satisfying the data request, and ii) is configured to attempt to satisfy the data request using an output of the virtual sensor.

40. The client device of claim 37, wherein the sensor interface i) is configured to provide a virtual sensor that converts at least one of the two different types of sensor data in response to determining that the at least one of the two different types of sensor data is not capable of satisfying the data request, and ii) is configured to attempt to satisfy the data request using an output of the virtual sensor.

41. A non-transitory computer-readable storage medium comprising instructions, which, when executed by a client device, cause the client device to perform operations, the instructions comprising:
code to receive one or more data requests from a number of client applications configured for execution by the client device, wherein the one or more data requests include a data request that specifies a particular type of sensor measurement data to be returned, without identifying a particular physical sensor to be used in acquiring the particular type of sensor measurement data;
code to discover, in response to receiving the one or more data requests, a number of physical sensors that are physically installed in the client device from which the client device can currently receive sensor data that can be used to obtain the particular type of sensor measurement data specified by the data request;
code to receive from at least two different types of physical sensors of the number of physical sensors that are physically installed in the client device, at least two different types of sensor data; and
code to attempt to satisfy the data request using the at least two different types of sensor data.

42. The non-transitory computer-readable storage medium of claim 41, further comprising:
code to enable only those of the number of physical sensors that are used to satisfy the data request.

43. The non-transitory computer-readable storage medium of claim 41, further comprising:
code to combine the at least two different types of sensor data in response to determining that at least one of the two different types of sensor data is not capable of satisfying the data request.

44. The non-transitory computer-readable storage medium of claim 41, further comprising:
code to convert at least one of the two different types of sensor data in response to determining that the at least one of the two different types of sensor data is not capable of satisfying the data request.

45. The non-transitory computer-readable storage medium of claim 41, further comprising:
code to create a virtual sensor.

46. The non-transitory computer-readable storage medium of claim 41, further comprising:
code to provide one or more quality of service requests associated with the data request; and
code to determine sensor data that can be used to satisfy the one or more quality of service requests.

47. A client device, comprising:
means for receiving one or more data requests from a number of client applications configured for execution by the client device, wherein the one or more data requests include a data request that specifies a particular type of sensor measurement data to be returned, without identifying a particular physical sensor to be used in acquiring the particular type of sensor measurement data;
means for discovering, in response to receiving the one or more data requests, a number of physical sensors that are physically installed in the client device from which the client device can currently receive sensor data that can be used to obtain the particular type of sensor measurement data specified by the data request;
means for receiving, from at least two different types of physical sensors of the number of physical sensors that are physically installed in the client device, at least two different types of sensor data; and means for attempting to satisfy the data request using the at least two different types of sensor data.

* * * * *